| United States Patent [19] | [11] Patent Number: 4,735,982 |
| Orndorff, Jr. | [45] Date of Patent: Apr. 5, 1988 |

[54] THERMOPLASTIC-RUBBER POLYMER ALLOYS AND METHOD FOR PRODUCING THE SAME

[75] Inventor: Roy L. Orndorff, Jr., Kent, Ohio

[73] Assignee: The B. F. Goodrich Company, Akron, Ohio

[21] Appl. No.: 889,541

[22] Filed: Jul. 25, 1986

[51] Int. Cl.$^4$ .......................... C08K 3/08; C08L 9/00; C08L 11/00; C08L 23/06

[52] U.S. Cl. .................... 524/269; 524/261; 524/267; 524/406; 524/515; 524/518; 524/519; 524/525; 525/211; 525/215; 525/232; 525/240

[58] Field of Search ............... 524/525, 261, 406, 267, 524/269, 518, 519; 525/232, 211, 240, 215

[56] References Cited

U.S. PATENT DOCUMENTS

| 2,381,270 | 8/1945 | Enz . | |
| 3,023,059 | 2/1962 | Kirk . | |
| 3,489,710 | 1/1970 | Bonotto et al. | 524/525 |
| 3,497,278 | 2/1970 | Orndorff, Jr. . | |
| 3,561,830 | 2/1971 | Orndorff, Jr. . | |
| 3,582,166 | 6/1971 | Reising . | |
| 3,724,919 | 4/1973 | Lagally et al. . | |
| 3,774,983 | 11/1973 | Lagally . | |
| 3,826,547 | 7/1974 | Finefrock . | |
| 4,341,838 | 7/1982 | Imai et al. | 524/525 |
| 4,386,182 | 5/1983 | Zijp | 525/232 |
| 4,433,073 | 2/1984 | Sano et al. | 524/525 |

OTHER PUBLICATIONS

Material Selection Criteria for Water Lubrication, Watt V. Smith—Wear, 25, (1973), 139–153—printed in The Netherlands.

*Primary Examiner*—Allan M. Lieberman
*Attorney, Agent, or Firm*—Joseph Januszkiewicz

[57] ABSTRACT

A thermoplastic-rubber polymer alloy contains a tough, wear resistant low friction thermoplastic such as ultra high molecular weight polyethylene, a cured rubber compound such as nitrile rubber, an a lubricant such as graphite in effective amounts to produce a composition which has good wet and dry friction and wear properties. The ultra high molecular weight polyethylene is typically utilized in a sufficient amount so as to form a continuous phase with the thermoset rubber being present as particles dispersed throughout the polyethylene as a discontinuous phase. The polymer alloy is made by dry blending the thermoplastic compound with ground thermoset rubber whereby the rubber is coated, heating and mixing the composition to above the glass transition temperature of the thermoplastic compound and subsequently cooling under pressure. The alloy can be easily transfer molded because of the lubricating action of the heated, softened plastic. The alloy is ideally suited for use as a hard bearing material due to its low coefficient of friction and low wear rate.

17 Claims, 1 Drawing Sheet

THERMOPLASTIC-RUBBER POLYMER ALLOYS AND METHOD FOR PRODUCING THE SAME

FIELD OF THE INVENTION

The present invention relates to a hard, thermoplastic-rubber polymer alloy which is a heterogeneous mixture of a low friction, good wear resistant thermoplastic, a thermoset rubber, and a lubricant. The present invention also relates to a method of making the polymer alloy.

BACKGROUND OF THE INVENTION

Heretofore, bearings, such as those utilized in connection with the rotating shaft driving a ship's propeller, have been made from rubber. The bearings have been fluted so that they are water lubricated. Attempts to incorporate a low friction thermoplastic into the rubber have been unsuccessful. Examples of typical bearing assemblies and/or compositions thereof are set forth in the following patents:

U.S. Pat. No. 2,381,270 to Enz relates to a bearing assembly having staves therein and a keeper strip which is formed of laminated fiberous material such as paper, cloth fabric, fiberglass, etc., impregnated with a resinous binder such as phenolic, urea, vinyl, and the like.

U.S. Pat. No. 3,023,059 to Kirk relates to rubber bearings composed of non-conductive materials and to a non-metallic supporting sleeve composed of a plastic material which is reinforced with a material such as fiberglass.

U.S. Pat. No. 3,497,278 to Orndorff relates to a shaft bearing wherein the bearing surface is formed of strips of elastomeric material which line the inner periphery of a cyindrical housing between radially inwardly projecting lugs with each strip being secured therein by a locking bar inserted in a longitudinal groove in the strip.

U.S. Pat. No. 3,561,830 to Orndorff relates to a resilient elastomeric insert for bearings of the type used for marine propeller shafts wherein the insert is formed of a low hardness elastomeric material and has rigid backing strips inserted in the elastomer spaced closely adjacent to the bearing surfaces.

U.S. Pat. No. 3,582,166 to Reising relates to a bearing having a low friction surface formed of fibers of a low-friction resin, for example polytetrafluorethylene, in a hard resin matrix, the longitudinal axis of substantially all of the fibers extending substantially parallel to the surface of the bearing.

U.S. Pat. No. 3,724,919 to Lagally, et al relates to a low friction bearing-journal arrangement which can be lubricated by seawater wherein the rubbing surface of a titanium journal in combination with a high density polyethylene bearing is protected against scuffing or galling by a small concentration of iodine which can be absorbed at the bearing surface or be present as water-soluble iodine salt or complex.

U.S. Pat. No. 3,774,983 to Lagally relates to a low friction bearing-journal arrangement which contains a first member made from high density polyethylene and a second member, which mates with the first member, formed from a high modulus supporting material such as titanium, zirconium, and the like.

U.S. Pat. No. 3,826,547 to Finefrock relates to a water lubricated bearing wherein a housing is formed with a cylindrical bore in which a plurality of symmetrically spaced keys are mounted. A compliment of staves formed entirely of elastomeric material are positioned in the bore and directly compressed by a removable compression head to cause tight engagement between the bore and keys. Removal of the compression head allows the staves to assume their unstressed condition in which clearance is provided with respect to both the bore and the keyways.

The article Material Selection Criteria for Water Lubrication by Watt V. Smith, Wear, 25 (1973) 139-153 printed in the netherlands, relates to service performance parameters and material selection for water lubricated contact materials selection for water lubricated contact materials such as those utilized in marine equipment. Table II of the article on page 152, relates to the abrasive wear resistance of non-metallic materials.

While the above article and patents generally relate to materials which are utilized as bearings, they do not teach or suggest applicant's polymer alloy, a process for making the same, or the use of the alloy as a bearing.

SUMMARY OF THE INVENTION

It is therefore an aspect of the present invention to provide a thermoplastic thermoset rubber polymer alloy which has, among other properties, good wet and dry friction and wear resistant properties.

It is a further aspect of the present invention to produce a thermoplastic-thermoset rubber polymer alloy, as above, which contains a tough but low wear, low friction thermoplastic such as ultra high molecular weight polyethylene, a cured rubber such as nitrile rubber, and a lubricant.

It is yet a further aspect of the present invention to provide a process for making a thermoplastic-thermoset rubber polymer alloy, as above, wherein the thermoplastic and the thermoset are dry blended, subsequently heated and then cooled under pressure.

It is yet a further aspect of the present invention to provide a thermoplastic-thermoset rubber polymer alloy, as above, which is suitable for use in bearings, and especialy in marine bearings.

It is a still further aspect of the present invention to provide a thermoplastic-thermoset rubber polymer alloy, as above, wherein the amount of the various components can be varied to meet desired end use properties.

It is a still further aspect of this invention to provide a new and improved elastomeric bearing assembly that has a plurality of circumferentially spaced bearing elements or segments with water grooves therebetween wherein such bearing elements are made from a thermoplastic-thermoset rubber that provides low friction resistance to a propeller shaft during start up where there is an absence of lubricant on the bearing surfaces even though immersed in water yet also provides low friction resistance to the same propeller shaft once sufficient speed is achieved and the shaft is run on the water lubricated bearing surface.

These and other aspects of the present invention will become apparent from the following specifications.

In general, a thermoplastic-rubber polymer alloy comprises; a cured rubber compound, a low friction, tough thermoplastic compound, the amount of said thermoplastic compound being an effective amount to form a continuous phase in the polymer alloy, and a lubricant, the amount of said lubricant being an effective amount to impart lubricating properties to said polymer alloy.

DETAILED DESCRIPTION OF THE INVENTION

Figure 1:
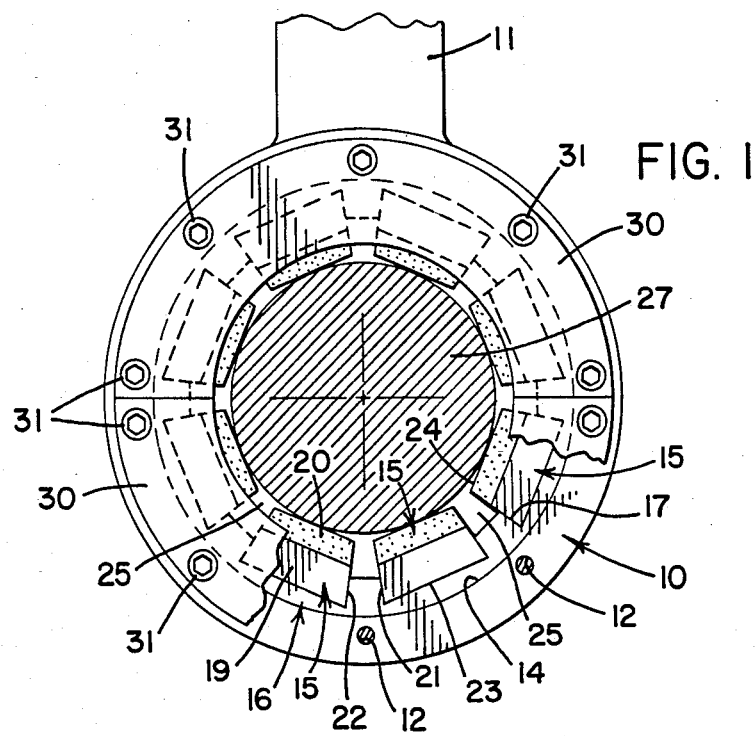
FIG. 1 is a front elevational view of a strut and bearing assembly having a portion of the supporting structure broken away to disclose the bearing elements or staves and a propeller shaft.
Figure 2:
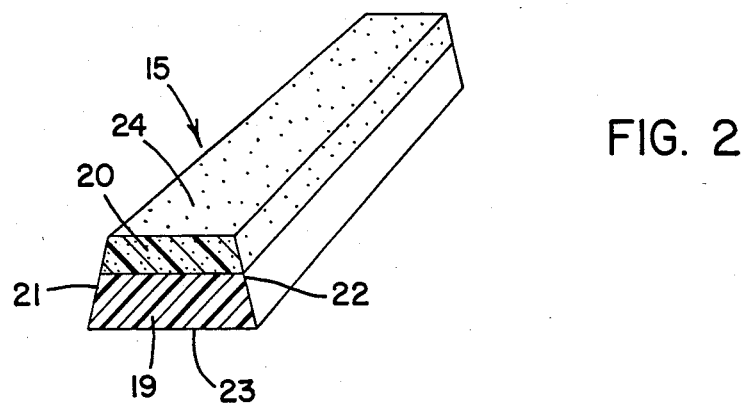
FIG. 2 is a cross sectional view of one of the bearing elements or staves.

Referring to the drawings, wherein like reference numerals designate like or corresponding parts throughout the several views, there is shown in FIG. 1 a longitudinally extending bearing housing 10 supported by a strut 11. Housing 10 has a pair of annular end faces, with each end face having a plurality of circumferentially spaced threaded bores 12 extending longitudinally therein. The housing 10 has a central bore 14 to accommodate a bearing assembly to be described. The bearing assembly can be a single cast unit or composed of a plurality of circumferentially spaced bearing segments or staves. In the example above, the central bore 14 receives a cylindrical shell 16 having a plurality of circumferentially spaced dovetailed grooves 17 suitably machined therein. As seen in FIG. 1, there are eight dovetail grooves 17. The staves 15 as seen in FIG. 2 are composed of a rigid layer of ultra high molecular weight polyethylene material 19 suitably bonded to a thermoplastic-rubber polymer alloy layer 20 described hereinbelow. Stave 15 is trapezoidal in cross-sectional shape having a pair of side surfaces or faces 21–22, a linear disposed outer flat face 23 and an inner flat bearing face or surface 24. A portion of the respective side surfaces 21 and 22 are in abutting contact with the dovetailed grooves 17. All of staves 15 are similar in construction.

The circumferentially spaced staves or bearing elements 15 provide a plurality of circumferentially spaced grooves 25 between the bearing elements or staves to permit passage of water. The circumferentially spaced staves 15 support a propeller shaft 27 for rotation. The bearing assembly is held in position within bore 14 of housing 10 by a pair of semi-circular retainer rings 30 acting as retainer means mounted on the respective end faces of the cylindrical shaped housing 10. Rings 30 have a plurality of circumferentially spaced bores which receive cap screws 31 which are threaded into the respective bores 12 to thereby securely fasten the bearing assembly within the housing 10 and place on the shaft 27.

In the operation of the bearing assembly, assuming the shaft 27 is stationary, shaft 27 will remain in contact with the surfaces of the polymer alloy layer 20 under essentially dry conditions even though the bearing assembly is under water because there is no lubricant (water) between the polymer alloy layer 20 and the shaft 27. As shaft 27 begins to rotate, and as the primary dry friction is overcome, sufficient water comes in between the rotating shaft 27 and the inner bearing surface 24 of the polymer alloy layer 20 to be a water lubricated bearing surface. In this condition of operation the inner surface of layer 20 as lubricated presents a different coefficient of friction than dry. However, as hereinafter described, the new bearing polymer alloy of layer 20 presents superior wet and dry friction and wear properties to provide a material advantage for use as a water-lubricated bearing with the additional advantage of being able to be secured to a rigid backing such as ultra high molecular weight polyethylene.

A thermoplastic and a thermoset rubber compound, along with a smaller amount of a lubricant form the thermoplastic-rubber polymer alloy. The alloy is a heterogeneous composition wherein the thermoplastic exists in a continuous phase and the thermoset is dispersed therein as a discontinuous phase. In other words a thermoplastic matrix is formed, having the thermoset compound and the lubricant dispersed therein, as opposed to an admixture.

The thermoplastic compound can be any polymer which exhibits tough, low friction and good wear resistant properties. A specific group of such polymers are the various ultra high molecular weight polyethylenes which are known to the art as well as to the literature. Ultra high molecular weight polyethylenes are generally classified as those having a weight average molecular weight of greater than 2.5 million, that is from about 3.0 million to about 7.0 million using the solution viscosity method. A desired range is from about 4 million to about 6.5 million with a preferred range being from about 5 million to about 6 million. Such polyethylenes are commercially available from American Hoechst Plastics Corporation under the name Hostalen GUR.

The ultra high molecular weight polyethylene as well as other polymers generally suitable for use in the present invention typically have low friction properties such as a breakaway coefficient of static friction at 0 rpm of 0.25 or less, desirably 0.20 or less and preferably 0.15 or less. The desired thermoplastic compounds of the present invention also have a toughness as measured by an Izod notch impact test (ASTM D256) of 20 or greater and preferably of 30 or greater. However, unnotched test samples did not fail. The thermoplastic compounds of the present invention also have good wear resistance as measured by a sand slurry abrasion test. The sand slurry abrasion test is a test of American Hoechst Plastics Corporation wherein generally a test specimen (1"×3"×¼") is rotated at 1200 RPM over a 24 hour period in a slurry containing 2 parts of water and 3 parts of sand.

An effective amount of the ultra high molecular polyethylene is utilized such that it forms a continuous phase in the polymer alloy. Generally, the amount of a thermoplastic compound is sufficient to coat the thermoset rubber compound which generally exist in the form of particles and more desirably an amount in excess of that required to coat the rubber particles. Based upon the total weight of the polymer alloy, the amount of the thermoplastic often utilized is from about 25% to about 90% by weight, desirably from about 40% to about 75% by weight and preferably from about 55% to about 65% by weight.

The thermoset compound is a cured rubber compound which typically has low friction as well as good oil and water resistant properties. By "low friction" it is meant that rubber bearings of a desired thickness range, when water lubricated, develop hydrodynamic lubrication at normal journal (shaft) operating speeds. Thin rubber bearings develop hydrodynamic friction at lower shaft speeds than any other known bearing material due to the plasto-elastohydrodynamic effect. Hydrodynamic lubrication is the developing of a fluid film between the bearing and a rotating shaft. By the terms "oil and water resistant", it is meant that the elastomer is unaffected (not dissolved or softened) and the volume increase caused by swell in water is under 5%, and preferably under 3%.

Generally any rubber compound having such friction and water resistant properties can be utilized. A specific group of such compounds are various nitrile rubbers which are known to the art and to the literature. For example, the various Hycar nitrile rubbers manufactured by the BFGoodrich Company can be utilized. The various harder nitrile rubber compounds are generally preferred. A specific example of such a rubber is compound 39166 (80 Shore A hardness) manufactured by the BFGoodrich Company. Another example is a softer nitrile rubber such as compound 39433, also manufactured by the BFGoodrich Company which has a Shore A hardness of about 65. Other rubbers include Butyl rubber, EPDM, that is rubber made from ethylene-propylene-diene monomers, and fluorelastomers based on the copolymer of vinylidene fluoride and hexafluoropropylene thought to have the following repeating structure —$CF$—$CH$—$CF$—$CF(CF)$—. Such copolymers are sold under the Trademark "Viton" by DuPont. Although these other rubber compounds can be utilized, the nitrile rubbers are highly preferred.

It is an important aspect of the present invention that the rubber compound can be initially dry blended or mixed with the thermoplastic compound before the alloy is formed.

Accordingly, the rubber compound is cured and in order to mix the two components, it is ground to a suitable size. Conventional grinding methods can be utilized such as mechanical or cryogenic grinding. Particle size of the cured rubber compound is generally important. The particle size is generally measured as being finer, that is being able to pass through, a specific Tyler mesh screen. The cured rubber compounds thus generally have a particle size smaller than 35 mesh, desirably smaller than 65 mesh, and preferably smaller than 100 mesh. The amount of the cured rubber in the polymer alloy is generally from about 10% to about 70% by weight, desirably from about 12% to about 40% by weight and preferably from about 15% to about 30% by weight based upon the total weight of the polymer alloy.

The lubricant is generally added in the form of a solid and hence is non-liquid. In order to ensure a good dispersal thereof, the lubricant typically is in the form of a powder. By the term powder, it is meant that a majority, and at least 70%, 80%, or 90% and more desirably at least 95% of the particles are smaller than a Tyler 100 mesh screen, that is 150 microns. Desirably, a majority of the powder, typically 80%, 90%, or even 95% is smaller than 200 mesh, that is 75 microns. Preferably a majority of the graphite powder, that is 70%, 80%, or 90% is smaller than 325 meshs, that is 44 microns. Any lubricant known to the art as well as to the literature can be utilized which imparts lubricating properties to the polymer alloy. By lubricating properties it is meant that the coefficient of friction of the surface of the formed polymer alloy is reduced, as for example, on the order of at least 10% and more desirably at least 20% or 30% when wear starts. The lubricant also should be non-abrasive. Graphite constitutes a preferred lubricant. An example of a specific graphite is grade 117-A, manufactured by Asbury Graphite Mills, Inc. Another specific lubricant is molybdenum disulfide. Although not generally preferred, molybdenum disulfide is desirable in dry end use applications where moisture is not available, even as atmospheric moisture vapor. Silicone oils can also be utilized in an amount of from about 2% to about 10% by weight and desirably from about 3% to about 6% by weight based upon the total weight of the polymer alloy. Examples of specific silicone oils include 200 Fluid manufactured by Dow Corning.

The amount of the lubricant generally is from about 0.5% or 3% by weight to about 25% by weight, desirably from about 1.0% to about 20% by weight, and preferably from about 2% to about 10% by weight based upon the total weight of the polymer alloy.

It has been surprisingly found that the thermoplastic-rubber polymer alloy of the present invention has many of the advantages of the respective thermoplastic component and thermoset rubber component and very few of the disadvantages of each. The polymer alloy has very good resistance to bearing and shaft wear in water and yet readily operates under dry conditions and has low deflection under load. The polymer alloy is a strong solid having good tensile strength which is thought to be imparted thereto by the thermoplastic compound. The lubricant naturally contributes to the lubricating properties as well as reducing the dry friction coefficient of the polymer alloy. Another unexpected property of the polymer alloy is that unlike nitrile rubbers, it has low compression set.

In addition to the above components, various optional components can be utilized to impart specific improved properties to the polymer alloy. For example, various lubricant aids can be utilized to further reduce the coefficient of friction of the polymer alloy. Thus, polytetrafluoroethylene (PTFE) which serves as a lubricant when in a powder form, can be utilized. Other fluorhydrocarbon polymers as well as chloro-fluorohydrocarbon polymers which impart strength and lubricity to the polymer alloy can also be utilized. The amount of these polymers is the same as the amount of the silicone oil.

Still another optional component which is generally utilized only when the polymer alloy is subjected to high pressures as for example 3,000 psi or greater is PTFE fibers. The fibers are short, that is chopped, and have a length approximately from about 1/16" to about ¼", although larger or smaller fibers can be utilized. Generally any reinforcing fibers can be utilized known to the art as well as to the literature. Specific examples of such fibers include glass, polyaramide, polyfluorohydrocarbons such as polytetrafluoroethylene, and the like. When glass fibers are utilized, care is taken not to utilize excessive amounts thereof in that they can act as an abrasive. The amount of glass fibers is generally from about 1% to about 10% by weight and desirably from about 2% to about 6% by weight based upon the total weight of the polymer alloy.

It is an important aspect of the present invention that the polymer alloy be made by initially dry mixing at least the thermoplastic compound and the thermoset compound. Since the rubber must be dry, it is cured. An amount of the thermoplastic is utilized so that at least the rubber particles are coated. As noted above, generally an excess of the thermoplastic is utilized. Inasmuch as the thermoplastic particles or powder will melt upon heating, a heterogeneous matrix is formed having as a continuous phase the thermoplastic compound with the cured rubber dispersed therein constituting a discontinuous phase. The lubricant and the various optional additives can be added with the thermoplastic compound or subsequent to the dry mixing of the thermoplastic and the cured rubber compounds. Regardless of whether or not all of the components are added together, the dry mixing of the thermoplastic and the cured rubber is continued until a generally uniform random dispersion of the cured rubber is achieved. Once a dispersion of the rubber as well as the remaining ingredients has been obtained, the mixture can be heated. The heating temperature must be above the glass transition temperature (Tg) of the thermoplastic. The Tg of ultrahigh molecular weight polyethylene is approximately 287° F. A desirable heating range for a polymer alloy forming blend containing ultra high molecular weight polyethylene has been found to be from about 290° F. to about 360° F. and desirably from about 310° F. to about 350° F. Should lower temperatures be utilized, the thermoplastic will generally not have sufficient flow properties to produce a desirable matrix. Temperatures above 360° F. generally result in a loss of tear strength of the cured rubber, for example nitrile rubber and thus should be avoided.

Another important process aspect of the present invention is that the melted mixture is cooled under pressure. Cooling can take place in any type of apparatus such as a mold and pressure is generally necessary in order to prevent cracking and/or strain failure of the formed alloy. The amount of pressure is generally at least 600 PSI and desirably at least 1000 PSI. Cooling can be carried out at ambient temperature, that is the mold can simply be placed in an ambient environment, or at a temperature below the Tg of the thermoplastic or water-cooled press platens. The specific gravity of the polymer alloy is generally about 1.1. Although cooling can take place in a mold designed to yield a specific product or article, a compression type mold is generally utilized to form a solid slab. The slab generally can be machined, cut with a saw, etc., if desired.

Specific end products or articles can be formed by utilizing a variety of molding methods. It has been found that the polymer alloy can easily be transfer-molded because of the lubricating action of the heat softened plastic and is thus preferred. Waste and trim can be recycled. Another forming method includes compression molding as well as injection molding. Flash and other molding operation features can be removed as by grinding. Moreover, the molded article can be readily and precisely machined utilizing conventional and standard machining operations such as reaming, lapping, horning, grinding, and the like.

The formed polymer alloy generally exhibits the superior properties of the thermoplastic as well as the thermoset rubber and hence is a rigid, tough, low wear hard solid which has good water resistance and low deflection under load. The polymer alloy also has a superior wet as well as a dry low coefficient of friction and a low breakaway coefficient of friction. Hence, the polymer alloy can be utilized for articles wherein such properties are desired. A highly desirable end use is as a bearing and particularly as marine bearings such as those used in rotatably supporting the propeller shaft of ships and the like. Inasmuch as some marine bearing applications require harder bearing materials to reduce shaft deflection as in icebreakers than other marine applications which require different properties, a polymer alloy family of wet-dry bearing products are possible with varying recipes. Other products include staves, shaft sleeves, and the like.

The invention will be better understood by reference to the following examples.

EXAMPLE I

Ultra high molecular weight polyethylene powder, Hostalen GUR manufactured by American Hoechst Corporation, having a molecular weight of approximately 4.5 million in an amount of 321.48 grams was mixed with 117.9 grams of ground cured nitrile rubber, compound 39166 manufactured by BFGoodrich. Then, 87.2 grams of graphite powder, grade #117-A from Asbury Graphite Mills, was mixed with the plastic and rubber in a Henschel mixer. Only rubber which passed through a Tyler 35 mesh screen was utilized. A mold was preheated to 350° F. A smooth steel plate of 11.5"×2.75" was placed therein. The mixture was added to the mold and compressed while heating. The mold contents were heated at a temperature of 350° F. for one hour under 667 psi. The pressure was maintained during cool down. The cool down time period was one hour. The total thickness of the cured sample was 0.720".

The polymer alloy of Example I was compared in various tests with UHMWPE, Thordon XL, Romor, and Standard Kayak. These compounds are as follows:

UHMWPE—an ultrahigh molecular weight polyethylene manufactured by American Hoechst Plastics having a weight average molecular weight of approximately 3.0 to 6.0×$10^6$.

Thordon XL—A graphite-loaded, hard polyurethane bearing material sold by Thomson-Gordon Limited, (Burlington, Ontario, Canada). A wet-dry bearing material.

Romor—Trademark for patented BFGoodrich/LQ Morritt thin rubber, plastic backed bearing stave—used to support propeller shafts (in ships). Water-lubricated, very low friction and wear, especially at low speeds where other conventional materials encounter trouble.

Kayak—Trademark for 1" inside diameter×1.5" outside diameter×4" long BFG rubber full bearing (brass outer shell).

EXAMPLE II

Standard Cutless Bearing Wet (Water) Wear Test

Single, 2" long staves of the various materials set forth above were tested. The journal diameter was 10", the velocity was 20 RPM and the test was run continuously for 28 days. The load was equivalent to that carried by the heaviest loaded stave in a fully staved bearing having an NPSI value of 210 NPSI. (Normal Cutless Bearing NPSI value is 40 NPSI).

TABLE I

| | Polymer Alloy of Example I | UHMWPE | Thordon XL | #4 Romor |
|---|---|---|---|---|
| Wear Rate, (1 × $10^{-4}$ grams/hour) | 0.0045 | 165 | 1,897 | 0.937 |
| Hours | 668 | 164 | 23 | 661 |

As apparent from TABLE I, the polymer alloy of the present invention had a very good water lubricated wear rate compared to the ultra high molecular weight polyethylene and the Thordon XL. The Thordon XL lasted only 23 hours before the sample was worn so much that it had to be removed.

EXAMPLE III

The materials were then tested with regard to coefficient of friction against shaft velocity and breakaway. The test is a standard BFGoodrich test. Shaft diameter is 10" and the sample size is the same as used in the Example II wear test. NPSI load was 40 NPSI.

TABLE II
WATER-LUBRICATED DYNAMIC AND STATIC COEFFICIENTS OF FRICTION

DYNAMIC COEFFICIENTS:
(Shaft Diameter = 10")

| Shaft RPM | Polymer Alloy of Example I | UHMWPE | Thordon XL | #4 Romor |
|---|---|---|---|---|
| 0   | 0.0876 | 0.0666 | 0.3288 | 0.1577 |
| 10  | 0.0250 | 0.0085 | 0.0987 | 0.0563 |
| 25  | 0.0035 | 0.0027 | 0.0169 | 0.0169 |
| 50  | 0.0020 | 0.0012 | 0.0027 | 0.0034 |
| 75  | 0.0015 | 0.0020 | 0.0024 | 0.0020 |
| 100 | 0.0012 | 0.0012 | 0.0013 | 0.0019 |
| 125 | 0.0014 | 0.0014 | 0.0009 | 0.0022 |
| 150 | 0.0013 | 0.0013 | 0.0011 | 0.0017 |
| 175 | 0.0016 | 0.0013 | 0.0010 | 0.0019 |
| 200 | 0.0014 | 0.0010 | 0.0014 | 0.0014 |
| 225 | 0.0022 | 0.0018 | 0.0020 | 0.0012 |
| 250 | 0.0021 | 0.0020 | 0.0017 | 0.0004 |

Breakaway (Static) Coefficients:
Dwell Time Under Load (at 0 Velocity)

|  | Polymer Alloy | UMWPE | Thordon XL | #4 Romor |
|---|---|---|---|---|
| 1 Min   | 0.1872 | 0.1248 | 0.4125 | 0.6700 |
| 10 Min  | 0.2184 | 0.1622 | 0.4442 | 0.7300 |
| 100 Min | 0.2309 | 0.1872 | 0.5395 | 0.7600 |

As apparent from TABLE II, the coefficient of friction values for the polymer alloy of Example I were generally the same as those for UHMWPE and lower than for Thordon XL and Romor. Breakaway values were slightly greater than those for UHMWPE, but significantly lower than those for Thordon XL and #4 Romor.

EXAMPLE IV

The test results set forth in Example II and III were made with initially flat staves. The sample test results set forth herein and in TABLES III, IV, and V were made with molded full bearings having a 1" journal (bore) diameter. The polymer alloy and Kayak standard example had flat lands. The Thordon XL bearings had concave lands. Samples were run at 30 RPM between tests. The results are set forth in TABLES III, IV, and V. NPSI=Radial load divided by bearing bore diameter×bearing length.

TABLE III
(12.4 NPSI) - Water Lubricated
Dynamic Coefficient of Friction Values

| RPM | Polymer Alloy of Example I | Thordon XL | Standard Rubber Kayak |
|---|---|---|---|
| 0.5 | 0.0897 | 0.1446 | 0.4537 |
| 2   | 0.0848 | 0.1692 | 0.3969 |
| 5   | 0.0897 | 0.1791 | 0.3139 |
| 10  | 0.0897 | 0.1989 | 0.2650 |
| 20  | 0.1044 | 0.1989 | 0.1918 |
| 40  | 0.1044 | 0.1939 | 0.1429 |
| 80  | 0.1191 | 0.2186 | 0.0843 |
| 120 | 0.1437 | 0.1939 | 0.0697 |
| 160 | 0.1437 | 0.1939 | 0.0648 |
| 200 | 0.1388 | 0.1692 | 0.0501 |
| 300 | 0.1388 | 0.1446 | 0.0404 |
| 500 | 0.1191 | 0.1199 | 0.0257 |
| 600 | 0.1240 | 0.0952 | 0.0208 |

Shaft diameter = 1 inch.

TABLE IV
(50.5 NPSI) - Water Lubricated
Dynamic Coefficient of Friction Values

| RPM | Polymer Alloy of Example I | Thordon XL | Standard Kayak |
|---|---|---|---|
| 0.5 | 0.0884 | 0.3631 | 0.4073 |
| 2   | 0.0932 | 0.3631 | 0.2961 |
| 5   | 0.0932 | 0.3386 | 0.1753 |
| 10  | 0.1174 | 0.3386 | 0.1414 |
| 20  | 0.1174 | 0.3288 | 0.1173 |
| 40  | 0.1174 | 0.2653 | 0.0786 |
| 80  | 0.1174 | 0.2408 | 0.0593 |
| 120 | 0.1320 | 0.2408 | 0.0448 |
| 160 | 0.1368 | 0.2506 | 0.0351 |
| 200 | 0.1416 | 0.3240 | 0.0327 |
| 300 | 0.1416 | Machine | 0.0254 |
| 500 | 0.1416 | Stalled | 0.0133 |
| 600 | 0.1368 | Stalled | 0.0109 |

Shaft diameter = 1 inch

TABLE V
(50.5 NPSI) - Dry
Coefficient of Friction Values

| RPM | Sample X | Thordon XL |
|---|---|---|
| 0.5 | 0.1804 | 0.2626 |
| 2   | 0.2142 | 0.2626 |
| 5   | 0.2142 | 0.2626 |
| 10  | 0.2384 | 0.2384 |
| 20  | 0.2626 | 0.2384 |
| 40  | 0.2868 | 0.2384 |
| 80  | 0.3207 | 0.2481 |
| 120 | 0.3110 | 0.2384 |
| 160 | 0.3352 | 0.2384 |
| 200 | 0.3836 | 0.2384 |
| 300 | Machine | 0.2626 |
| 500 | Stalled | Machine |
| 600 | Stalled | Stalled |

Shaft diameter = 1 inch

As apparent from TABLE III AND IV, the polymer alloy of the present invention had lower coefficient of friction values than Thordon XL. Standard Kayak values were higher at lower shaft speeds. Although rubber bearings cannot operate dry, the polymer alloy of the present invention nevertheless had lower dry coefficient of friction values at the lowest speeds although the Thordon XL sample had lower dry friction values above 10 RPM (Table V). No shaft or polymer alloy bearing wear was apparent in the test of the new alloy set forth in TABLE V even though 50.5 NPSI is high for a dry bearing. In contrast, the Thordon XL bearing excessively wore the bronze journal shaft. The entire contact length of the shaft was worn and six grooves were formed with several grooves on the 1" diameter shaft having depths of at least 0.05".

Thus, the polymer alloy of the present invention exhibited very good bearing wear resistance wet or dry. It caused minimum wear on journals. It also exhibited low breakaway friction and favorable low coefficient of friction values across the entire shaft speed range. The wear caused by the polymer alloy on the shaft was not measurable after the Table V test. The use of high strength chopped fibers (such as Kevlar) would increase the compressive stiffness if needed. It is thus apparent that the polymer alloy of the present invention yielded significantly improved frictional wear resistant properties when compared with conventional materials.

While in accordance with the Patent Statutes, a best mode and preferred embodiment have been set forth in detail, the scope of the invention is not limited thereto, but rather by the scope of the attached claims.

What is claimed is:

1. A thermoplastic-rubber polymer alloy, comprising;
    a particulate cured rubber compound having a particle size of 35 mesh or smaller, said cured rubber compound being a low friction, water resistant compound,
    an ultra high molecular weight polyethylene polymer, said ultra high molecular weight polyethylene polymer having a weight average molecular weight of at least 2.5 million the amount of said ultra high molecular weight polyethylene polymer being an effective amount to form a continuous phase in the polymer alloy and to coat, said rubber particles, and
    a non abrasive lubricant, the amount of said lubricant being an effective amount to impart lubricating properties to said alloy.

2. A plastic-rubber polymer alloy according to claim 1, wherein said rubber compound is nitrile rubber, butyl rubber, EPDM, a copolymer of vinylidene fluoride and hexafluoropropylene, or combinations thereof, wherein said ultra high molecular weight polyethylene has a weight average molecular weight of from about 3 million to about 7 million, and wherein said lubricant is graphite, molybdenum disulfide, silicone oil, or combinations thereof.

3. A plastic-rubber polymer alloy according to claim 2, wherein said rubber compound forms a discontinuous phase, wherein said rubber compound is nitrile rubber, and wherein said lubricant is a graphite powder, wherein said graphite has a particle size of 100 mesh or smaller, wherein the amount of ultra high molecular weight polyethylene is from about 25% to about 90% by weight based upon the total weight of the polymer alloy, wherein the amount of said nitrile rubber is from about 10% to about 70% by weight based upon the total weight of the polymer alloy, and wherein the amount of said graphite is from about 0.5% to about 25% by weight based upon the total weight of said polymer alloy.

4. A plastic-rubber polymer alloy according to claim 1, wherein said cured rubber compound and has a volume increase in water of 5% or less.

5. A plastic-rubber polymer alloy according to claim 3, wherein said cured rubber compound is a low friction rubber and has a volume increase in water of 3% or less.

6. A thermoplastic-rubber polymer alloy, comprising;
    from about 25% to about 90% by weight of an ultra high molecular weight polyethylene polymer having a weight average molecular weight of at least 2.5 million based upon the total weight of the polymer alloy, said ultra high molecular weight polyethylene polymer having a breakaway coefficient of static friction of 0 RPM of 0.25 or less,
    from about 10% to about 70% by weight of a particulate cured rubber compound based upon the total weight of the polymer alloy, said cured rubber compound having a particle size of 35 mesh or smaller, said cured rubber compound being a low friction, water resistant compound,
    from about 0.5% to about 25% by weight of a non-abrasive lubricant based upon the total weight of the polymer alloy.

7. A thermoplastic -rubber polymer alloy according to claim 6, additionally comprising from about 2% to about 10% of short fibers.

8. A thermoplastic -rubber polymer alloy according to claim 7, wherein said short fibers are fiber glass, poly aramid, polyfluorhydrocarbon or combinations thereof.

9. A thermoplastic-rubber polymer alloy according to claim 6, wherein said ultra high molecular weight polyethylene has a weight average molecular weight of from about 3.0 million to about 7.0 million.

10. A thermoplastic-rubber polymer alloy according to claim 9, wherein said ultra high molecular weight polyethylene has a weight average molecular weight of from about 4 million to about 6.5 million, wherein said rubber compound is butyl rubber, EPDM, or copolymer of vinylidene fluoride and hexafluorpropylene, nitrile rubber, or combinations thereof, wherein said rubber compound has an average particle size of 65 mesh or smaller, wherein said lubricant is a solid in the form of a powder, wherein said solid lubricant is graphite, molybdenum disulfide, or combinations thereof, wherein the amount of said ultra high molecular weight polyethylene is from about 40% to about 75% based upon the total weight of said polymer alloy, wherein the amount of said rubber compound is from about 12% to about 40% by weight based upon the total weight of said polymer alloy, and wherein the amount of said lubricant is from about 1% to about 20% by weight based upon the total weight of said polymer alloy.

11. A thermoplastic-rubber polymer alloy according to claim 10, wherein the amount of said ultrahigh molecular weight polyethylene is from about 55% to about 65% by weight based upon the total weight of said polymer alloy, wherein said rubber compound is said nitrile rubber, wherein the amount of said nitrile rubber is from about 15% to about 30% by weight based upon the total weight of said polymer alloy, wherein said lubricant is said graphite, wherein said graphite has a particle size of 100 mesh or smaller, and wherein the amount of said graphite is from about 2% to about 10% by weight based upon the total weight of said polymer alloy.

12. A thermoplastic-rubber polymer alloy according to claim 9, wherein said cured rubber compound is a low friction rubber and has a volume increase in water of 5% or less.

13. A process for forming a thermoplastic-rubber polymer alloy comprising the steps of:
    dry mixing (a) cured rubber particles having a particle size of 35 mesh or smaller, said cured rubber compound being a low friction, water resistant compound, (b) an ultra high molecular weight polyethylene polymer having a weight average molecular weight of at least 2.5 million, and (c) a solid non-abrasive lubricant in amount effective to impart lubricating properties to said alloy, said ultra high molecular weight polyethylene polymer having a breakaway coefficient of static friction at 0 RPM of 0.25 or less, the amount of said ultra high molecular weight polyethylene polymer being an effective amount to form a continuous phase and to coat said rubber particles, heating said mixture to a temperature above the glass transition temperature of said ultra high molecular weight polyethylene polymer, and cooling said heated mixture under pressure and forming the polymer alloy, said cooling pressure being 600 PSI or greater.

14. A process according to claim 13, wherein the amount of said ultra high molecular weight polyethylene is from about 25% to about 90% by weight based upon the total weight of the polymer alloy, wherein the amount of said rubber particles is from about 10% to about 70% by weight based upon the total weight of said polymer alloy, and wherein the amount of said lubricant is from about 0.5% to about 25% by weight of a lubricant based upon the total weight of the polymer alloy,.

15. A process according to claim 14, wherein said rubber compound is nitrile rubber, butyl rubber, EPDM, a copolymer of vinylidene fluoride and hexafluoropropylene, or combinations thereof, wherein said lubricant is graphite, molybdenum disulfide, or combinations thereof, wherein said heating temperature is from about 290° F. to about 360° F.

16. A process according to claim 15, wherein the amount of said ultra high molecular weight polyethylene is from about 40% to about 75% by weight based upon the total weight of the polymer alloy, wherein said rubber compound is nitrile rubber, wherein the amount of said nitrile rubber is from about 12% to about 40% by weight based upon the total weight of the polymer alloy, wherein said lubricant is graphite having a particle size of 100 mesh or smaller, wherein the amount of said graphite is from about 2% to about 10% by weight based upon the total weight of said polymer alloy, wherein said rubber particle size is 65 mesh or smaller, wherein said heating temperature is from about 310° F. to about 350° F., and wherein said cooling pressure is 1,000 PSI or greater.

17. A process according to claim 13, wherein said cured rubber compound is a low friction rubber and has a volume increase in water of 5% or less.

* * * * *